3,511,821
TERPOLYMERS OF ISOBUTYLENE-METHYL-CYCLOPENTADIENE AND A CROSSLINKING AGENT
Paul Thomas Parker, Fred J. Buchmann, and Lawrence Wesley McLean, Baton Rouge, La., assignors to Esso Research and Engineering Company, a corporation of Delaware
Filed Oct. 23, 1963, Ser. No. 318,369
Int. Cl. C08d 3/04
U.S. Cl. 260—80.7                         1 Claim This invention relates to a process for producing hydrocarbon polymers and is typified by the production of a terpolymer of a major amount of isobutylene with minor amounts of methylcyclopentadiene (MCPD) and divinylbenzene (DVB). More particularly, this invention relates to improved catalyst systems for producing high molecular weight, highly unsaturated terpolymers of isobutylene, methylcyclopentadiene and divinyl benzene prepared by using said catalyst systems.

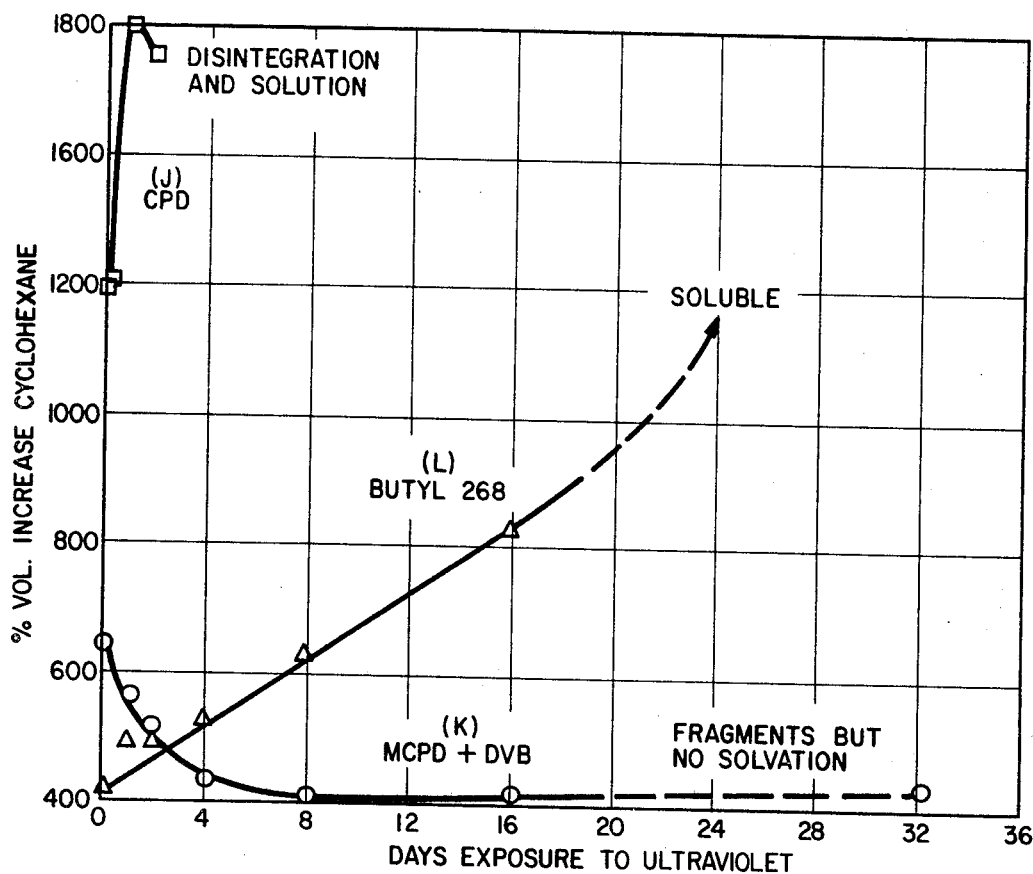

It has been known that cyclic diolefins such as cyclopentadiene (CPD) can be copolymerized with isobutylene and some divinylbenzene to give ozone resistant butyl elastomers. U.S. Patent No. 2,626,940 discloses that such polymers can be made with $AlCl_3$ catalyst. While these polymers were potentially attractive, little utilization was made of them because of the low molecular weights encountered when necessary quantities of cyclopentadiene were introduced into the feed. Further, while the addition of divinylbenzene was found to be effective in raising the molecular weight of the product, it was found that such addition had a deleterious effect on the residual unsaturation. This loss in unsaturation was presumably due to crosslinking through the cyclodiene monomer units in the polymer chain. It was further found that the vulcanizates prepared from the polymeric products had certain drawbacks in their physical properties, as exemplified by low modulus values, regardless of polymer unsaturation.

It is an object of the present invention, therefore, to provide improved terpolymers of isobutylene, a cyclic diene, and a crosslinking agent, such as divinyl benzene. It is also an object of the present invention to provide such polymeric products which are characterized by both relatively high molecular weights and high residual unsaturation. Other objects will appear hereinlater.

In accordance with the present invention, it has now been surprisingly found that by using an alkyl aluminum chloride or bromide catalyst having a ratio of alkyl groups to halogen atoms in the range of about 0.4:1 to about 0.7:1, preferably 0.5:1 to 0.6:1, dissolved in an alkyl halide—the type of solvent heretofore indicated by the prior art to be deleterious—that a superior catalyst for the preparation of terpolymers of isobutylene is obtained. By using a catalyst with the ratio of alkyl groups to halogen atoms in this range, great improvements in the Mooney viscosity and molecular weights of said terpolymers are obtained and, advantageously, while using smaller amounts of divinylbenzene than heretofore employed in the art. These polymerizations take place in the absence of any water or hydrogen halide promoters, that is, less than 0.1 wt. percent of these materials based on the total reaction mixture will be present in the reaction zone. Furthermore, it has been surprisingly found that by using this catalyst system, high unsaturation isobutylene terpolymers having relatively high Mooney viscosities can be prepared on a commercially feasible basis.

The alkyl aluminum halide catalysts for use in the present invention may be prepared by any of the following general methods, the preparation of ethyl aluminum dichloride being used for illustrative purposes:

(1)      ⅓ $AlEt_3$ + ⅔ $AlCl_3 \rightarrow EtAlCl_2$ (2)      $Et_2AlCl + HCl \rightarrow EtAlCl_2 + EtH$ (3)      $AlEt_3 + 2HCl \rightarrow EtAlCl_2 + 2\ EtH$ The first method indicated is the preferred method because it uses the least amount of relatively expensive aluminum triethyl.

In the preferred method of manufacture, the catalyst is prepared by contacting solid aluminum chloride with an alkyl halide at temperatures from about −70° to about −110° F., preferably −80° to −100° F., specifically −90° F., to dissolve solid aluminum chloride and obtain a solution containing 0.30 to about 0.03, preferably 0.20 to 0.10, specifically 0.15 wt. percent of aluminum chloride. To this solution is added the aluminum alkyl in an amount necessary to provide the desired ratio of alkyl groups to halogen atoms. The resulting solution is then thoroughly mixed. Suitable aluminum alkyls for use in the present invention are $C_1$ to $C_8$, preferably $C_2$ to $C_4$, straight- or branched-chain aluminum alkyls. Examples are aluminum triethyl, aluminum tri-isopropyl, aluminum tri-n-pentyl, aluminum trihexyl, and the like.

The preferred class of solvents for use in preparing the catalyst system of the present invention is $C_1$ to $C_5$ alkyl halides and polyhalides. Suitable solvents include methyl chloride, methylene chloride, ethyl chloride, methyl bromide, carbon tetrachloride, etc., preferably methyl chloride. In addition, carbon disulfide and its analogues and homologues may be used. These solvents are preferred because aluminum chloride and aluminum bromide are sufficiently soluble therein to obtain a desired concentration of the aluminum halide in solution prior to the reaction with aluminum alkyl.

Normally, about 0.2 to 0.8 grams, preferably about 0.3 to 0.5 grams, of the alkyl aluminum halide catalyst in solution is required to produce about 100 grams of the polymer product of the present invention.

The polymerization feeds suitable for the preparation of high unsaturation terpolymers according to this invention consist of iso-olefins containing 4 to 7 carbon atoms, e.g. isobutylene or 2-methyl-1-butene, preferably isobutylene in combination with a specific cyclodiolefin vis., methylcyclopentadiene, and divinylbenzene. In contrast to the usual methods of preparing polymers containing a cyclodiolefin, all of the compounds encompassed by said term, for example, cyclopentadiene, conjugated cyclohexadiene, and the like, are not suitable for use in the present invention. Thus the present invention is exclusively directed to, and thereby limited to, the use of methylcyclopentadiene in order to achieve the foregoig objects. Conversely, while the present invention is directed to the use of divinylbenzene, it should be understood that other compounds which are also suitable crosslinking compounds, e.g., 6,6-dimethylfulvene, can also be employed.

In accordance with the present invention, the methylcyclopentadiene is employed in concentrations of from about 1 up to about 6 wt. percent, preferably in the range of about 2 to about 5 wt. percent based on iso-olefins. The divinylbenzene is incorporated in amounts of from 0.1 up to about 3 wt. percent based on iso-olefin, preferably in amounts of from about 0.1 to 1.0 wt. percent in order to form the polymers of the present invention.

The polymerization temperatures employed for the preparation of the high unsaturation isobutylene terpolymers are maintained between about −160° F. and about −120° F., preferably between about −150° F. and about −130° F., specifically −140° F. Concentrations of the total monomers contained in the alkyl halide solvent are from about 10 to about 30 wt. percent, preferably from about 12 to about 24 wt. percent, e.g., 20 wt. percent, for conventional nonhydrocarbon solvent polymerization, and from about 8 to about 18 wt. percent, specifically 15 wt. percent for hydrocarbon solvent polymerization. The polymerization occurs promptly on addition of catalyst and is conducted preferably in a continuous reaction. Residence times are from about 10 to about 120 minutes, preferably from about 20 to about 60 minutes, e.g., 40 minutes, to obtain conversions of isobutylene of above 50%, preferably above 70%, specifically 75%, equivalent to unreacted olefinic monomer in the reactor of 3 to 7%.

In either the batch or the continuous reaction, following such reaction the product is mixed with about 30 to about 100, preferably about 50, volumes of warm water based on solid polymer in a flash tank. This kills the catalyst, volatilizes out the unpolymerized monomers and the diluent if used, and converts the polymer from a slurry in a cold reaction mixture into a slurry in warm water. Various slurry stabilizers and polymer stabilizers may be added to the flash tank. The polymer is separated, for example, by filtration, followed by drying and hot milling. The solvent is then dried to less than 15 p.p.m. of water and separated from the unreacted feed if desired; at least a major portion of the solvent, or solvent plus unreacted feed is recycled. A small quantity of pure solvent is separated and used in preparing the aluminum chloride solvent solution which is mixed with an aluminum alkyl, as described above, and used in the polymerization.

As so prepared, the terpolymer has a viscosity average molecular weight of over 100,000 and generally between about 300,000 and about 500,000, preferably about 400,000 to 450,000 and should contain between about 3.0 and 6.0 percent, preferably 3.5 to 4.5 percent unsaturation. The polymer should also contain about 0.2 to 1.0 percent, preferably 0.4 to 0.6 percent, of combined divinyl aromatic compound.

The resulting terpolymers can be vulcanized with sulfur, especially in the presence of conventional vulcanization accelerators. Carbon black, zinc oxide and/or other pigments or fillers or plasticizers of the hydrocarbon type or of the ester types and other conventional compounding ingredients may also be present.

The terpolymers provided for by the process of the present invention are characterized by high molecular weights, as represented by high Mooney viscosity values, high residual unsaturation, and low cold flow properties. Evaluation of polymers so characterized show that such polymers have the attractive properties which follow:

(1) Ozone resistance of the polymers is excellent; even in formulations which are highly loaded.

(2) The polymers have excellent cure rates, that is, a cure rate as fast as the fastest curing commercial isoprene butyl (e.g. Butyl 325) known at the preparation of the present application.

(3) The polymers possess a surprising resistance to ultraviolet light and exhibit a tendency to crosslink rather than to break down as do the known isobutylene polymers when exposed to U.V. light.

Of the foregoing, the most attractive property of the present invention is their isobutylene terpolymers' resistance to U.V. degradation. The development of surface tack upon exposure to sunlight, up to the present invention, has prevented the application of butyl polymers into applications requiring light-colored stocks in outdoor exposure. As hereinafter illustrated, the terpolymers of the instant invention maintain a tack-free surface under U.V. exposure. Thus, the products of the instant invention are well suited for application such as light-colored roof coatings and the like as well as for use under highly oxidative conditions.

The present invention will be more clearly understood from the consideration of the following specific examples, which are given to illustrate the invention and not to limit its scope.

EXAMPLE I

Aluminum chloride-aluminum triethyl catalysts were prepared by first allowing methyl chloride, which had been dried so as to contain less than 5 parts per million of water, to flow through a bed of granular $AlCl_3$, which had been prewashed with methyl chloride. The preparation of the $AlCl_3$ solution took place at temperatures between about −80° to about −100° F. To the resulting solution of $AlCl_3$ in methyl chloride was added, with thorough mixing, aluminum triethyl in amounts sufficient to give the indicated weight percent of $AlEt_3$ on $AlCl_3$. Prior to use in the polymerization, the catalyst solution is diluted to give the indicated concentration of equivalent $AlCl_3$ per 100 grams of methyl chloride.

Using this catalyst, i.e. a complex of aluminum triethyl with aluminum chloride (60 wt. percent of aluminum triethyl based on aluminum chloride) high molecular weight, high unsaturation isobutylene methylcyclopentadiene divinylbenzene polymers were prepared from feedstock containing the monomer concentrations set forth in Table I below. Samples of each polymer were cured for 40 minutes at a temperature of 307° F., using the following cure recipe:

| | Parts by wt. |
|---|---|
| Polymer | 100 |
| Channel black 375 | 50 |
| Zinc oxide | 5 |
| Stearic acid | 3 |
| Altax (benzothiazyl disulfide) | 0.5 |
| Tuads (tetramethylthiuram disulfide) | 1 |
| Sulfur | 2 |

The properties of those cured butyl rubbers are set forth in Table I. Also in this table, for purposes of product comparison, are the properties of Enjay Butyl 325, cured by the same recipe. This commercially available product is the fastest known curing regular grade of butyl rubber.

TABLE I

| Catalyst | A | B | C |
|---|---|---|---|
| Conc., g. $AlCl_3$/100 g. $CH_3Cl$ | 0.29 | 0.33 | 0.41 |
| Wt. percent of $AlEt_3$ based on $AlCl_3$ | 55 | 55 | 55 |
| Mole percent $AlEt_3$ based on $AlCl_3$ | 65 | 65 | 65 |
| Conc. after dilution, g./100 g. $CH^3Cl$ | 0.16 | 0.16 | 0.19 |
| Flow rate into reactor, g./min. | 22 | 20 | 21 |
| Polymerization: | | | |
| Feed flow rate, g./min. | 122 | 122 | 110 |
| $CH_3Cl$ diluent flow rate, g./min. | 10 | 15 | 15 |
| Reactor temp., −°F. | 141 | 144 | 142 |
| Total hydrocarbon content, wt. percent | 12.7 | 12.5 | 12.2 |
| MCPD, percent on $i$-$C_4^=$ | 3.0 | 4.0 | 5.0 |
| DVB, percent on $i$-$C_4^=$ | 0.55 | 0.55 | 0.55 |
| Slurry, wt. percent | 7.5 | 8.0 | 6.3 |
| Conversion of monomers to polymers, percent | 59 | 64 | 52 |
| Unreacted hydrocarbons, wt. percent | 5.6 | 4.9 | 6.3 |
| Run length, hours | 3.0 | 3.0 | 3.0 |
| Catalyst efficiency, g. polymer/g. catalyst [1] | 220 | 230 | 140 |

[1] Catalyst efficiencies are based on $AlCl_3$ only.
MCPD=methylcyclopentadiene, DVB=divinyl, benzene $i$-$C_4^=$=isobutylene.

| Product | A | B | C | Commercial Butyl 325 |
|---|---|---|---|---|
| Molecular wt. ×$10^{-3}$ | 400 | 430 | 430 | 310 |
| Mooney at 260° F. | 46 | 61 | 33 | |
| Mooney at 212° F. (ext.) | 64 | 91 | 48 | 41–49 |
| Unsaturation, mol percent | 2.3 | 3.3 | 4.5 | ca. 2.0 |
| Gel wt. percent | 1.6 | 9.5 | 0.4 | |
| Specification cure: | | | | |
| Tensile, p.s.i. | 2,850 | 2,400 | 2,475 | [1] 2,300 |
| Modulus at 300% p.s.i. | 1,250 | 1,250 | 1,620 | |
| Modulus at 400% p.s.i. | 1,830 | 1,840 | 2,160 | 1,375–1,600 |
| Elongation, percent | 650 | 550 | 470 | [1] 500 |

[1] Min.

These data indicate that the improved terpolymers produced by the practice of this invention cure at least as rapidly as Butyl 325, the fastest curing regular grade of butyl rubber now available. The 40-minute cure of each of samples A, B, and C yielded a product which surpassed the 40-minute cure specification for the Butyl 325, thus in this instance indicating a curing rate exceeding that of Butyl 325.

EXAMPLE II

Aluminum chloride-aluminum triethyl catalyst was prepared according to the method described in Example I. The catalyst contained 60 wt. percent, equivalent to about 70 mole percent, of aluminum triethyl based on aluminum chloride.

Using this catalyst, isobutylene-isoprene feedstocks containing from 3 to 6 wt. percent of methylcyclopentadiene based on isobutylene were polymerized.

The data and results are shown in Table II.

TABLE II

| Catayst | D | E | F | G |
|---|---|---|---|---|
| Conc., g. AlCl$_3$/100 g. CH$_3$Cl | 0.23 | 0.33 | 0.28 | 0.28 |
| Conc. after dilution, g./100 g. CH$_3$Cl | 0.12 | 0.16 | 0.15 | 0.17 |
| Flow rate into reactor, g./min | 33 | 20 | 24 | 27 |
| Polymerization: | | | | |
| Feed flow rate, g./min | 105 | 122 | 122 | 123 |
| CH$_3$Cl diluent flow rate, g./min | 25 | 15 | 19 | 16 |
| Reactor temp., -° F | 143 | 144 | 141 | 143 |
| Total hydrocarbon content, wt. percent | 11.3 | 12.5 | 12.0 | 11.8 |
| MCDP, percent on i-C$_4^=$ | 3 | 4 | 6 | 3 |
| DVB, percent on i-C$_4^=$ | 0.55 | 0.55 | 0.8 | 0.3 |
| Slurry, wt. percent | 6.5 | 6.9 | 6.3 | 5.8 |
| Conversion of monomers to polymers, percent | 58 | 55 | 53 | 49 |
| Unreacted hydrocarbons, wt. percent | 5.1 | 6.0 | 6.1 | 6.4 |
| Run length hours | 2.0 | 3.0 | 3.2 | 3.1 |
| Catalyst efficiency, g. polymer/g. catalyst | 155 | 200 | 155 | 130 |
| Product: | | | | |
| 8 min. Mooney at 212° F | 59 | 74 | 74 | 54 |
| Viscosity average molecular weight ×10$^{-3}$ | 380 | 390 | 450 | 420 |
| Unsaturation, mole percent | 3.1 | 3.7 | 3.8 | 3.0 |

EXAMPLE III

To show that the active catalyst employed in the above examples is superior to a typical Friedel-Crafts catalyst, e.g. AlCl$_3$, a comparison was made using a sample of the catalyst prepared in accordance with Example I (Run I) and purchased AlCl$_3$ (Run H). The feedstocks contained the weight percentage of monomers are reported below. In Run H it was necessary to raise conversion by increased catalyst addition in order to attain an acceptable Mooney viscosity product. This necessity was caused by the phenomenon that as the amount of residual isobutylene in the reactor liquid decreases, the Mooney viscosity of the polymers produced increases. This behavior is believed to be somewhat unconventional relative to other butyl polymers (isoprene, etc.).

TABLE III
[Comparison of AlCl$_3$ vs. AlEt$_3$·2 AlCl$_3$]

| | H | I |
|---|---|---|
| Polymerization | AlCl$_3$ | AlEt$_3$·2 AlCl$_3$ |
| Catalyst: | | |
| MCPD in feed, percent on i-C$_4^=$ | 4.0 | 4.0 |
| DVB in feed, percent on i-C$_4^=$ | 0.40 | 0.55 |
| i-C$_4^=$-Monomer conversion | 82 | 64 |
| Product: | | |
| Mooney, 3 min. at 260° F | 43 | 61 |
| Unsaturation mol percent | 3.3 | 3.3 |
| Cure, 40 min. at 307° F.: | | |
| Tensile, p.s.i. | 1,775 | 2,400 |
| Modulus, p.s.i. at 400% elongation | 1,350 | 1,840 |
| Elongation, percent | 520 | 550 |

These data indicate that it is evident that the catalyst of the present invention imparts a distinct advantage over the Friedel-Crafts catalyst in unsaturation as exemplified by the Mooney value and in cure rate as exemplified by modulus.

EXAMPLE IV

A complex of aluminum triethyl with aluminum chloride (60 wt. percent of aluminum triethyl based on aluminum chloride) was prepared according to the method described in Example I. Using this catalyst, polymers were prepared from feedstocks containing isobutylene under polymerization conditions similar to those in Examples I, II, and III. Such polymers were subsequently modified and the content of the modifiers and product polymers are set forth in tabular form below.

| | J | K | L |
|---|---|---|---|
| CPD butyl [1] | 100 | | |
| MCPD-DVB butyl [2] | | 100 | |
| Butyl 268 | | | 100 |
| Zinc oxide | 5 | 5 | 5 |
| Sulfur | 2 | 2 | 2 |
| TDEDC | 1.2 | 1.2 | 1.2 |

[1] CPD Butyl, Unsat. 2.5 mole percent, Mooney viscosity at 212° F. -56.
[2] MCPD-DVB Butyl, feed MCPD 3%, DVB 0.55%, Mooney viscosity at 212° F. -59, Unsat. 3.3 mole percent.
CPD=cyclopentadiene, TDEDC=tellurium diethyldithiocarbonate.

A series of experiments were initiated so as to study the resistance of the above materials to sunlight exposure. In order to assign numerical values to sunlight resistance a thin film technique was used for the exposure tests. This technique involves the curing between stainles steel plates of very thin films of gum vulcanizates; thickness of the films was about 0.004 inch. Small specimens, about 1 inch by ½ inch in area were exposed around a 6-inch diameter circle, and a G.E. sun lamp was placed 6 inches above the center of t his circle. Samples were removed after 1, 2, 4, 8, 16 and 32 days and the change in network structure was observed by volume swell in cyclohexane. The results of these experiments are shown in Table IV, where a MCPD–DVB butyl rubber in accordance with this invention was compared to a CPD butyl and a regular nonstaining grade Butyl. It was observed that the MCPD-DVB butyl actually increased in crosslinked density during artificial sunlight exposure as is shown in columns K of Table IV. In column L of Table IV the regular butyl is shown to increase in swelling capacity, indicating a decrease in crosslink concentration or a breakdown in the network structure.

TABLE IV.—ULTRAVIOLET EXPOSURE OF VULCANIZED THIN FILMS

| Days exposure | J | K | L |
|---|---|---|---|
| 0 | 1,200 | 645 | 410 |
| 1 | 1,800 | 566 | 496 |
| 2 | 1,727 | 522 | 495 |
| 4 | (1) | 425 | 538 |
| 8 | (1) | 399 | 633 |
| 16 | (1) | 416 | 835 |
| 32 | (1) | (2) | Dissolves |

[1] Disintegrated.
[2] Fragments but does not appear to dissolve.

The results of these experiments are plotted in the drawing, which shows the descending nature of swelling-exposure curves for MCPD–DVB butyl and the ascending nature of the swelling-exposure curves for regular butyl. The network of regular butyl is being severed while the sample of MCPD–DVB butyl does not reach a crosslinked density comparable to regular butyl at the start of the test until 16 days exposure have elapsed. After about 8 days of exposure, the MCPD–DVB butyl vulcanizates begin to have a slight "crazing" of the surface and this surface is relatively dry to the touch while in contrast, regular butyl yields an increasingly tacky surface. After 16 days of exposure, the regular butyl thin film then becomes almost totally soluble in hydrocarbon solvents. On the other hand, at the end of 32 days exposure, the MCPD–DVP butyl still does not appear to be soluble in the hydrocarbon solvent although the cracked nature of he film results in fragments that are difficult to test for volume swell.

The resistance of this MCPD-DVB butyl to sunlight offers an important property which could extend the application of butyl to large scale uses such as roof coatings.

EXAMPLE V

To illustrate the criticality of using methylcyclopentadiene in the process of the present invention in order to attain the highly improved terpolymers described herein, a series of terpolymers were prepared under the general polymerization conditions set forth in Examples I and II. In these runs, however, the co-monomers were varied so as to compare isoprene (Butyl 325) and cyclopentadiene (Run N) copolymers with the methylcyclopentadiene copolymers (Runs O and P) of the present invention.

The data and results are tabulated in Table V.

From these data it is evident that the methylcyclopentadiene-containing terpolymer has very distinct advantages over the corresponding cyclopentadiene-containing polymer in cure rate as exemplified by the modulus values and in both tensile strength and elongation.

While there are above described a number of specific embodiments of the present invention, it is obviously possible to produce other embodiments and various equivalent modifications and variations thereof without departing from the spirit of the invention or the scope of the appended claims.

What is claimed is:

1. A highly U.V. resistant rubbery terpolymer composed of isobutylene, from 2 to 5 weight percent of methylcyclopentadiene based on isobutylene and from 0.1 to 1 weight percent of divinyl benzene based on isobutylene, said polymer characterized by a viscosity average molecular weight of between 300,000 and 500,000 and from 3.0 to 6.0 mole percent of unsaturation.

TABLE V

| Run | Relative Cure Rate | Mooney 8 Mon. M 212° F. | Vis. Avg. Molecular Wt.×10$^{-3}$ | Unsaturation, Mole percent | Cure, min. | Tensile, p.s.i. (min.) | Elongation (min.) | Modulus at 400% p.s.i. |
|---|---|---|---|---|---|---|---|---|
| Butyl 035 [1] | 100 | 45 | 325 | 1.0 | 40 | 2,600 | 700 | 650-900 |
| N [2] | 40 | 56 | 348 | 2.5 | 40 | 2,050 | 1,150 | 400 |
| O [3] | 100 | 59 | 401 | 1.5 | 40 | 2,700 | 800 | 1,070 |
| P [4] | 125 | 63 | 402 | 2.3 | 40 | 2,850 | 630 | 1,250 |

[1] Feed: Isoprene 1.4%.
[2] Feed: Cyclopentadiene 2.0%.
[3] Feed: Methylcyclopentadiene 1.75%.
[4] Feed: Methylcyclopentadiene 3.0%, Divinylbenzene 0.55%.

References Cited

UNITED STATES PATENTS 2,626,940  1/1953  Sparks et al. _____ 260—80.5
2,773,052  12/1956  Cohen et al. _____ 260—88.1
3,123,592  3/1964  Gasparoni et al. _____ 260—94.8

FOREIGN PATENTS 785,314  10/1957  Great Britain.

OTHER REFERENCES

Alfrey Mechanical Behavior of High Polymers, pp. 493–495, relied upon, Interscience Publishers (1948).
Dolgoplost et al., J. Pol. Sci. 553–209–16 (1961).

JAMES A. SEIDLECK, Primary Examiner

U.S. Cl. X.R.

260—41.5, 79.5